United States Patent [19]

Usami et al.

[11] 4,286,759
[45] Sep. 1, 1981

[54] WEBBING LOCK MECHANISM

[75] Inventors: Susumu Usami; Yoshihiro Hayashi; Junichi Nakaho; Jun Yasumatsu, all of Aichi, Japan

[73] Assignees: Toyota Jidosha Kogyo Kabushiki Kaisha; Kabushiki Kaisha Tokai Rika Denki Seisakusho, both of Aichi, Japan

[21] Appl. No.: 102,407

[22] Filed: Dec. 11, 1979

[30] Foreign Application Priority Data

Jan. 8, 1979 [JP] Japan ............................... 54-1525[U]

[51] Int. Cl.³ ..................... A62B 35/02; B65H 75/48
[52] U.S. Cl. .............................................. 242/107.2
[58] Field of Search ................. 242/107.2, 107.4 R, 242/107.4 E; 280/802–808, 801; 297/476, 478, 479, 480

[56] References Cited

U.S. PATENT DOCUMENTS 3,504,867 4/1970 Stevenson ..................... 242/107.2
3,817,473 6/1974 Board et al. ..................... 242/107.2
4,120,466 10/1978 Adomeit ......................... 242/107.2

Primary Examiner—John M. Jillions
Attorney, Agent, or Firm—Koda and Androlia

[57] ABSTRACT

A lock lever is pivotally supported by a frame secured to the vehicle body, the intermediate portion of a webbing for restraining an occupant is wound around a contact member secured to said lock lever, and, when the tension of the webbing is increased in an emergency, said lock lever turns whereby lock members clamp the intermediate portion of the webbing to lock same, so that the occupant can be restrained. Particularly, the contact member, during normal condition of the vehicle, is supported by a small diameter portion to smoothly guide the webbing, and, in an emergency of the vehicle, comes into contact at a large diameter portion thereof with said lock lever to receive a resisting force to the rotation, so that the portion of the webbing locked by the lock members can be decreased in tension.

8 Claims, 5 Drawing Figures

WEBBING LOCK MECHANISM

BACKGROUND OF THE INVENTION

1. Field of the Invention

This invention relates to a webbing lock mechanism used in a seatbelt system for locking an occupant restraining webbing as necessary, and particularly to a webbing lock mechanism designed to directly lock the intermediate portion of the webbing.

2. Description of the Prior Art

Heretofore, in general, there has been proposed such a construction of a webbing lock mechanism used in a seatbelt system that ratchet wheels are solidly secured to a take-up shaft for winding up the webbing from its end, and a pawl to be operated in an emergency of the vehicle is meshed with said ratchet wheels, whereby the webbing windoff rotations of the ratchet wheels and take-up shaft are locked. However, in the conventional webbing lock mechanism of the type described, even after the webbing windoff rotation of the take-up shaft is locked, the condition of loosely wound up webbing takes place until the respective layers of the webbing wound up onto the take-up shaft in layers come into tight contact with one another, thus causing a considerable length of webbing to be extended out.

To obviate the disadvantage as described above, there has been proposed a webbing lock mechanism capable of utilizing the tension of the webbing so as to directly lock the intermediate portion of the webbing when the tension of the webbing is increased in an emergency of the vehicle. In the webbing lock mechanism of the type described, a lock lever is pivotally supported by a frame, and the webbing is guided around the forward end of said lock lever, whereby the tension of the webbing in an emergency of the vehicle is imparted to the lock lever as an oscillating force, so that the oscillating force can be utilized to lock the intermediate portion of the webbing through lock members.

A roller is provided in said lock lever around which the webbing is guided so as to reduce the frictional resistance caused by the movement of the webbing. As the frictional resistance of the webbing at the roller is considerably high, the lock lever installed with a roller cannot satisfactorily reduce the resistance. Therefore, the occupant still feels high tension during windoff of the webbing from the take-up shaft.

SUMMARY OF THE INVENTION

To obviate the abovedescribed disadvantages, the present invention has as an object to provide a webbing lock mechanism wherein resistance applied to the webbing is very low during normal operation, and resistance is imposed to the movement of the webbing in an emergency of the vehicle, whereby the tension of the portion of webbing clamped by the lock members is reduced, so that the webbing can be perfectly locked.

In the webbing lock mechanism according to the present invention, a contact rod, around which the webbing is guided, is pivotally supported on a lock lever oscillatingly supported on a frame, said guide-round rod is pivotally supported on a lock lever through a small diameter portion thereof during normal operation, and, in an emergency of the vehicle, if the tension of the webbing is increased, said contact rod deflects and a large diameter portion thereof comes into contact with the lock lever so as to receive rotational resistance on the shaft thereof from the lock lever.

Description will hereunder be given of the embodiments of the present invention with reference to the drawings.

DESCRIPTION OF THE PREFERRED EMBODIMENT

Figure 1:
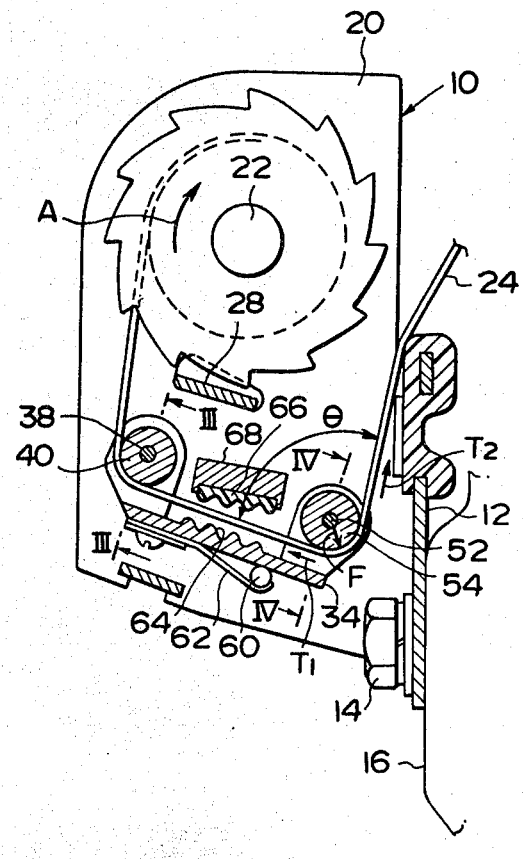
FIG. 1 is a cross-sectional view showing a first embodiment of the webbing lock mechanism according to the present invention.
Figure 2:
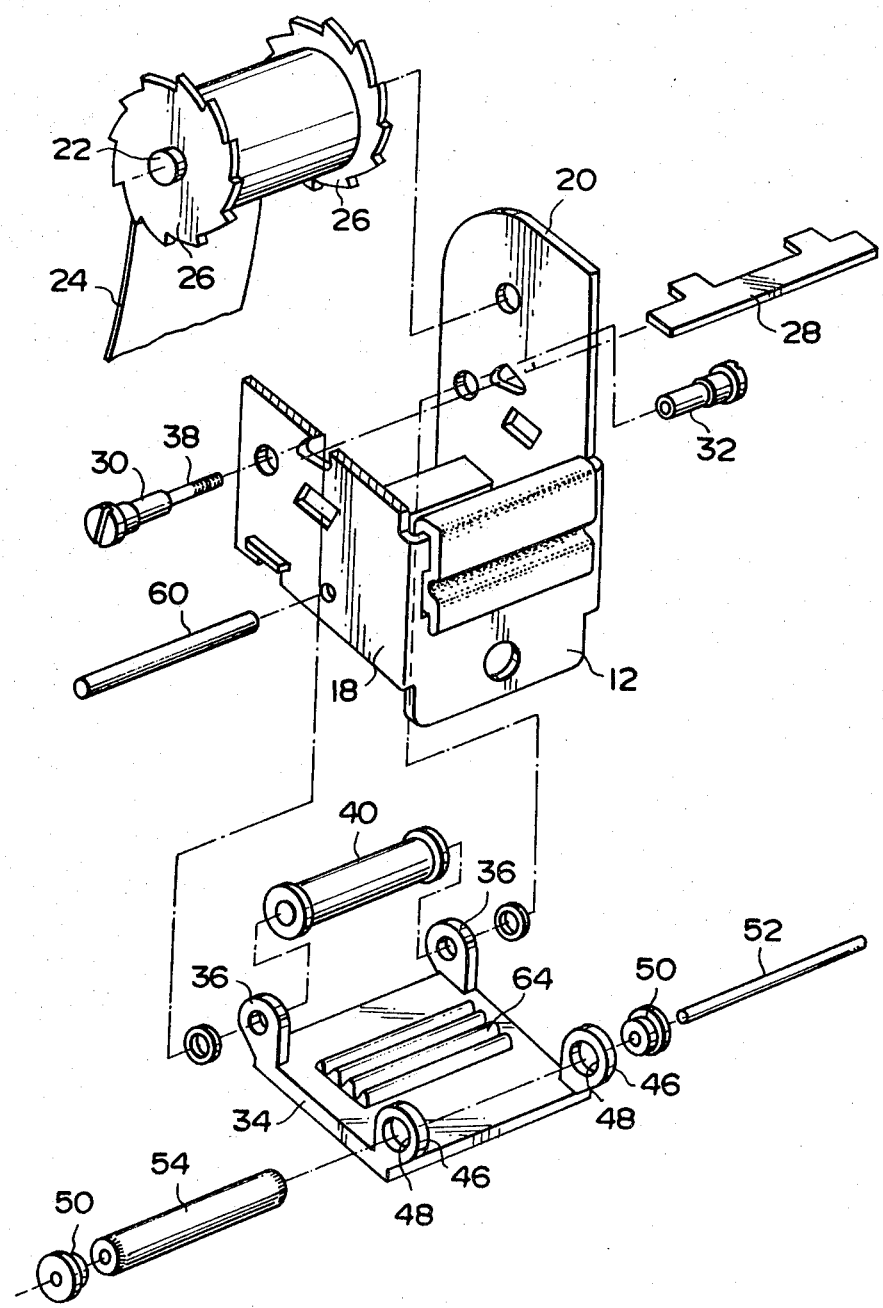
FIG. 2 is a disassembled perspective view of FIG. 1.

The embodiment shown in FIG. 1 is one in which the webbing lock mechanism according to the present invention is built in a webbing retractor 10. Said webbing retractor 10 is provided therein with a frame 12 which is solidly secured to the vehicle 16 through mounting bolts 14.

Pivotally supported by parallel legs 18, 20 of said frame 12 is a take-up shaft 22, which winds up the occupant restraining webbing 24 from one end thereof in layers. Said take-up shaft is biased by a biasing force of a spiral spring, not shown, in the windup direction (the direction indicated by an arrow A in FIG. 1) of the webbing 24. The other end, not shown, of said webbing 24 is drawn out of the retractor 10 to reach a portion thereof for restraining the occupant.

A pair of ratchet wheels 26 are solidly secured to the take-up shaft 22 and opposed to a pawl 28 tiltably supported by the parallel legs 18, 20. Said pawl 28 is actuated by a acceleration sensor such as a pendulum, not shown, to mesh with the ratchet wheels 26 so that the webbing windoff rotation of the ratchet wheels 26 and take-up shaft 22 (in a direction opposite to the direction indicated by an arrow A) can be prevented.

Figure 3:
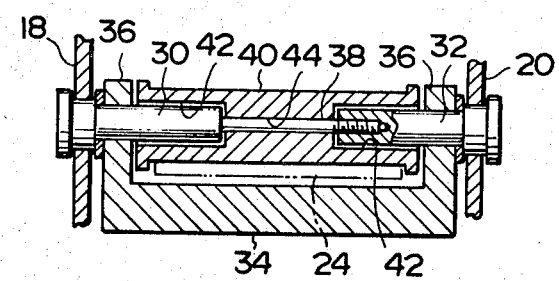
FIG. 3 is a cross-sectional view taken along the line III—III of FIG. 1.

Pivotally supported at the lower portions of the parallel legs 18, 20 is a lock lever 34 through support shaft 30, 32. Said support shafts 30, 32 penetrate the parallel legs 18, 20 in directions opposite to each other, and thereafter, pentrate bearing projections 36 of the lock lever 34. Furthermore, as shown in FIG. 3, a small diameter shaft portion 38 is projected from the forward end of the support shaft 30 in the axial direction thereof, and the forward end portion of the small diameter shaft portion 38 is threadably coupled into the support shaft 32, whereby the support shafts 30 and 32 have one and the same center axis. A roller 40 is pivotally supported on said support shafts 30, 32 between the bearing projections 36 of the lock lever 34. Said roller 40 is penetratingly provided at about opposite portions in the axial direction thereof with large diameter holes 42 which are slightly spaced apart from the outer diameters of the support shafts 30, 32. Additionally, said roller 40 is penetratingly provided at the intermediate portion in the axial direction thereof with a small diameter hole 44, through which the roller 40 is pivotally supported on the small diameter shaft portion 38.

Consequently, when the webbing 24 is guided around the outer periphery of said roller 40, the frictional resistance applied to the rotation of the roller 40 is considerably reduced due to the ratio between the diameter of the roller 40 and the small diameter hole 44, so that the webbing 24 can be smoothly moved. However, when deflection of the small diameter shaft portion 38 is increased in value, the large diameter portion 42 comes into contact with the outer diameters of the support shafts 30, 32, so that a large external force can be supported.

A pair of second bearing projections 46 are projected from portions close to the forward ends of the lock lever 34. Cylindrical holes 48 penetrated through said second bearing projections 46 receive flanged bushes 50, respectively. A support shaft 52 is pivotally supported by said flanged bushes 50. Pivotally supported on said support shaft 52 is a roller 54. Said roller 54 is provided at about the opposite end portions in the axial direction thereof with large diameter holes 56, and also provided at the intermediate portion in the axial direction thereof with a small diameter hole 58, through which said roller 54 is pivotally supported by the support shaft 52.

Here, the outer peripheries of the opposite end portions of the roller 54 are inserted into the cylindrical holes 48 of the second bearing projections 46, and are formed to have slightly smaller diameters than those of said cylindrical holes 48 with a clearance being maintained therebetween.

The support shaft 52 and the roller 54 constitute a contact rod means for the webbing 24. Said webbing 24 to be guided around the contact rod can move, rotating the roller 54, under a very small frictional resistance due to the ratio between the diameters of the roller 54 and support shaft 52. However, in the case the tension of the webbing 24 is increased, the support shaft 52 is deflected to bring the outer diameter portion of the roller 54 into contact with the cylindrical hole 48, whereby resistance is applied to the rotation of the roller 54 about the shaft. Furthermore, to insure the frictional resistance applied to the roller 54 from the cylindrical hole 48, the outer peripheries of axially opposite ends of the roller 54 are knurled.

A leaf spring 62 is interposed between said lock lever 34 and a stopper 60 racked across the parallel legs 18 and 20. Said lock lever 34 is biased towards the stopper 60 (in the clockwise direction in FIG. 1) by a biasing force of said leaf spring 62. Furthermore, a wave-shaped raised portion 64 is formed on the intermediate portion of the lock lever 34, and said wave-shaped raised portion 64 is adapted to approach a friction member 66 made of synthetic resin racked across the parallel legs 18 and 20 when the lock lever 34 is turned against the biasing force of the leaf spring 62, thereby constituting a lock member for clamping the intermediate portion of the webbing 24 between the lock lever 34 and said friction member 66. The outer surface of said friction member 66 has a configuration mating with the wave-shaped raised portion 64, and said friction member 66 is adapted to be secured to a reinforcing member 68 racked across the parallel legs 18 and 20.

In the present embodiment with the arrangement as described above, one end portion of the webbing 24 wound off from the take-up shaft 22 is guided around the rollers 40, 54, and thereafter, the other end, not shown, is withdrawn and fastened to the occupant.

Here, the occupant winds off a required length of the webbing from the take-up shaft 22 during normal running condition of the vehicle, so that he can change his driving posture. In this case, the rollers 40, 54 are pivotally supported by the small diameter shaft portion 38 and support shaft 52, respectively, so that the webbing 24 can move under a very low frictional resistance determined by the ratios between the diameters of the roller 40 and the small diameter shaft portion 38 and between the diameters of the roller 54 and the support shaft 52, thereby making the movement of the webbing very smooth to improve the operability when the webbing is fastened to the occupant, when the driving posture is changed during fastening of the webbing, and when the webbing is wound up after the webbing is unfastened.

Next, in case the vehicle is in an emergency such as a collision, an acceleration sensor, not shown, is actuated, whereby the pawl 28 meshes with the ratchet wheels 26, so that the webbing windoff rotation of the take-up shaft 22 can be suddenly stopped. On the other hand, the webbing 24 receives unwinding force of the occupant which increases the tension thereof, whereby said tension is imparted to the lock lever 34 through the roller 54, so that the lock lever 34 can be turned about the small diameter shaft portion 38 in the counterclockwise direction in FIG. 1. By this turning, the wave-shaped raised portion 64 of the lock lever 34 approaches the friction member 66 to clamp the intermediate portion of the webbing 24 therebetween.

The intermediate portion of the webbing 24 is directly locked as described above, whereby no tension acts on the webbing 24 wound up by the take-up shaft 22 and the condition of loosely wound up webbing does not take place, so that the occupant can be more restrained by the webbing 24.

In this case, due to increase in tension of the webbing 24, the support shaft 52 pivotally supporting the roller 54 is deflected, whereby the knurled portions on the outer peripheries of the axially opposite ends of the roller 54 come into contact with the cylindrical hole 48, thereby hindering the rotation of the roller 54. By this, a high tension acting on a portion of the webbing 24 between the roller 54 and the occupant restraining portion, not shown, is decreased by the rotation of the roller 54, whereby only a considerably reduced tension acts on the portion of the webbing 24 between the rollers 40 and 54. Consequently, the force is considerably reduced which draws out the webbing 24 clamped by the lock members from this clamped portion, whereby the intermediate portion of the webbing 24 is reliably locked between the wave-shaped raised portion 64 and the friction member 66.

In addition, a reaction force received by the lock lever 34 at this time of locking is imparted to the small diameter shaft portion 38, and, when said small diameter shaft portion 38 is deflected, the large diameter holes 42 of the roller 40 come into contact with the support shafts 30, 32. As a result, the reaction force received by the lock lever 34 is reliably supported by the frame 12, thus enabling to avoid damages caused to any portion thereof.

In the present embodiment, there is no need to stop the rotation of the roller 54 in an emergency of the vehicle, and, if a predetermined frictional resistance force is applied to the rotation of the roller 54, then the object of the present invention can be achieved. Now, the condition for stopping the roller 54 by a frictional resistance force will hereunder be sought by calculations.

The condition for the webbing 24 to slide on the outer periphery of the roller 54 when the roller 54 is hindered in rotation due to the frictional resistance between the roller 54 and the cylindrical hole 48 of the lock lever is given by:

$$\mu > \frac{\sin h\,(\mu b\theta)}{\sin\left(\frac{\theta}{2}\right) - \frac{F}{2T_2} e^{\left(\frac{\mu b\theta}{2}\right)}} \quad (1)$$

where the coefficient of friction between the roller and the webbing 24 is $\mu b$, the coefficient of friction between the roller 54 and the cylindrical hole 48 is $\mu$, the angle of the webbing 24 turned back at the roller 54 is $\theta$ as indicated in FIG. 1, the return load is F, which is applied by the support shaft 52 being deflected when the roller 54 is brought into contact with the cylindrical hole 48 of the lock lever 34, and the tension of the portion of webbing 24 between the roller 54 and the occupant restraining portion, not shown, is $T_2$.

Here, when $\mu b = 0.2$, $\theta = 90°$ $(=\pi/2)$, F = 50 Kgf, and $T_2 = 500$ Kgf, the condition is given by:

$$\mu > 0.243 \quad (2)$$

Here, in the actual design, said coefficient of friction can be fully satisfied with the surface treatment and surface working such as knurling.

Next, the relation between the tension $T_1$ of the portion of the webbing 24 between the rollers 54 and 40 and $T_2$ described above when the rotation of the roller 54 is stopped as described above is given by:

$$T_1 = T_2 \times e^{-\mu b\theta} \quad (3)$$

In this case, if $\mu b = 0.2$ and $\theta = 90°$ $(=\pi/2)$, $$T_1 = 0.73 \times T_2 \quad (4)$$

And, $T_1$ can be decreased in tension by 27% from $T_2$.

On the other hand, if the coefficient of friction between the wave-shaped raised portion 64, friction member 66 and the webbing 24 is $\mu L$, and a force at which the wave-shaped raised portion 64 and friction member 66 clamp the webbing 24 is P, it is necessary to satisfy the following formula to lock the webbing.

$$2\mu L \times P > T_1 \quad (5)$$

Here, when the roller 54 is rotated, $T_1 = T_2$. However, when the roller 54 is stopped in rotation, $T_1$ is reduced in value than that in the abovementioned (4). Hence, in consideration of the formula (5), it is sufficient that P can be small, whereby the lock lever 34 can be made compact in size. Furthermore, even if the clamping force of the webbing 24 is low, the webbing 24 can be reliably locked, thereby enabling to obviate the breakage of the webbing at the clamping portion.

Figure 4:
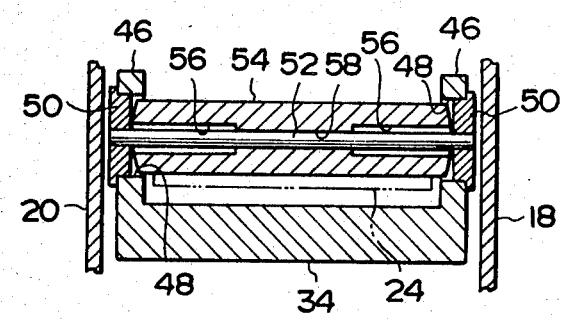
FIG. 4 is a cross-sectional view taken along the line IV—IV of FIG. 1.
Figure 5:
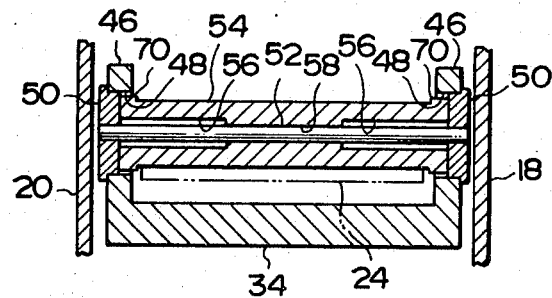
FIG. 5 is a cross-sectional view corresponding to FIG. 4 showing a second embodiment of the present invention.

Next, FIG. 5 is a cross-sectional view showing a second embodiment of the present invention, corresponding to FIG. 4 of the aforesaid first embodiment. In said second embodiment, flanges 70 are provided at axially opposite end portions of the roller 54, so that the webbing 24 guided around the roller 54 can be regulated in the axial direction of the roller 54.

As has been described so far, the webbing lock mechanism according to the present invention can offer such excellent advantages that, said webbing lock mechanism is pivotally supported by the lock lever through a small diameter portion of the contact rod during normal running condition, so that the frictional resistance to the movement of the webbing can be made very low, and moreover, in an emergency of the vehicle, the large diameter portion is brought into contact with the lock lever to apply rotational resistance about the shaft, so that the tension of the lock member applied to the clamping portion can be reduced to reliably lock the webbing.

While, in the abovedescribed embodiments, the webbing lock mechanism according to the present invention which is secured to the retractor is described. However, the present invention is not limited to the abovedescribed embodiments. Furthermore, although description has been given to the webbing lock mechanism used together with the mechanism in which the webbing windoff rotation of the take-up shaft is prevented in an emergency of the vehicle, the webbing lock mechanism can naturally be provided separately of said mechanism.

What is claimed is:

1. A webbing lock mechanism used in a seatbelt system for locking an occupant restraining webbing to restrain an occupant in an emergency of the vehicle such as a collision, comprising:
   (a) a frame secured to the vehicle body;
   (b) a lock lever pivotally supported by said frame for pivoting in an emergency of the vehicle;
   (c) a roller rotatably supported by said lock lever, around which an intermediate portion of said webbing is guided, said roller being provided with an emergency contact portion for coming into contact with said lock lever to receive resistance in an emergency of the vehicle; and
   (d) lock members for clamping the intermediate portion of said webbing to lock same when said lock lever pivots in an emergency of the vehicle thereby restraining the occupant having the webbing fastened thereto.

2. A webbing lock mechanism as set forth in claim 1, wherein radially outwardly projecting flanges are provided at axially opposite end portions of said roller, whereby the widthwise movement of the webbing wound around said roller is regulated.

3. A webbing lock mechanism as set forth in claim 1, wherein said lock members comprise a wave-shaped raised portion provided on said lock lever and a friction member secured to said frame and having another wave-shaped raised portion mating with said first wave-shaped raised portion, and the intermediate portion of the webbing is clamped between those wave-shaped raised portions.

4. A webbing lock mechanism as set forth in claim 3, wherein said lock lever is biased in a direction of being separated from said friction member.

5. A webbing lock mechanism as set forth in claim 1, wherein said frame is provided with a take-up shaft for winding up an end portion of said webbing, and a pawl is adapted to mesh with ratchet wheels solidly secured to said take-up shaft in an emergency of the vehicle so as to prevent the webbing windoff rotation of said take-up shaft.

6. A webbing lock mechanism as set forth in claim 1, wherein said emergency contact portion comprises a small diameter hole provided in an intermediate portion of said roller and a large diameter hole provided adjacent said small diameter hole and a shaft fixed to said lock lever and extending through small and large diameter holes rotatably supporting said roller on said lock lever.

7. A webbing lock mechanism as set forth in claim 1, wherein the outer periphery of said roller comes into contact with said lock lever to receive tension in an emergency of the vehicle.

8. A webbing lock mechanism used in a seatbelt system for restraining and protecting an occupant by a webbing fastened to the occupant, comprising:
   (a) a frame solidly secured to a vehicle body;
   (b) a lock lever pivotally supported by said frame;
   (c) a support shaft supported by said lock lever;
   (d) a roller pivotally supported on the outer periphery of said support shaft and said roller having an axially intermediate portion of a small inner diameter being in contact with said support shaft and the outer periphery of said roller being guided therearound for turning said lock lever when the tension of the webbing increases and the outer periphery of said support shaft at axially opposite end portions thereof coming into contact with said lock lever for receiving a resisting force to rotation when said support shaft is deflected; and
   (e) a pair of locking members provided between said lock lever and the frame for allowing the webbing to freely pass therethrough during normal condition of the vehicle and for clamping the intermediate portion of the webbing by the rotation of the lock lever so as to prevent the longitudinal movement of the webbing in an emergency of the vehicle.

* * * * *